(12) United States Patent
Mabuchi

(10) Patent No.: US 7,649,561 B2
(45) Date of Patent: Jan. 19, 2010

(54) PHYSICAL QUANTITY DETECTING DEVICE AND IMAGING APPARATUS

(75) Inventor: Keiji Mabuchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 11/554,653

(22) Filed: Oct. 31, 2006

(65) Prior Publication Data

US 2007/0109879 A1 May 17, 2007

(30) Foreign Application Priority Data

Nov. 1, 2005 (JP) .......................... P2005-317910

(51) Int. Cl.
*H04N 3/14* (2006.01)
*H04N 5/335* (2006.01)

(52) U.S. Cl. .................. 348/308; 348/302; 348/294

(58) Field of Classification Search ............... 348/243, 348/308
See application file for complete search history.

(56) References Cited

U.S. PATENT DOCUMENTS

| 6,043,525 | A* | 3/2000 | Chen ........................ 257/292 |
| 6,784,934 | B1* | 8/2004 | Watanabe .................. 348/308 |
| 7,119,840 | B2* | 10/2006 | Mabuchi ................... 348/308 |
| 2004/0239786 | A1* | 12/2004 | Masuyama et al. .......... 348/294 |
| 2004/0251396 | A1* | 12/2004 | Koyama ................... 250/208.1 |
| 2004/0252211 | A1* | 12/2004 | Rhodes ...................... 348/308 |

* cited by examiner

*Primary Examiner*—Sinh Tran
*Assistant Examiner*—Jason Flohre
(74) *Attorney, Agent, or Firm*—Sonnenschein Nath & Rosenthal LLP

(57) ABSTRACT

A physical quantity detecting device includes: a detecting unit that detects a physical quantity supplied from the outside; and pixels which are two-dimensionally arranged and each of which has a selecting transistor for outputting a signal from the detecting unit to a signal line. In the physical quantity detecting device, the selecting transistor is a depletion-type transistor.

5 Claims, 8 Drawing Sheets

PHYSICAL QUANTITY DETECTING DEVICE AND IMAGING APPARATUS

CROSS REFERENCES TO RELATED APPLICATIONS

The present invention contains subject matter related to Japanese Patent Application JP 2005-317910 filed in the Japanese Patent Office on Nov. 1, 2005, the entire contents of which being incorporated herein by reference.

BACKGROUND OF THE INVENTION

1. Field of the Invention

The present invention relates to a physical quantity detecting device for detecting a physical quantity supplied from the outside and to an imaging apparatus using a solid-state imaging device for detecting light incident from the outside as a physical quantity.

2. Description of the Related Art

A solid-state imaging device for detecting the intensity of light incident via a subject as a physical quantity or a fingerprint detecting device (capacitance detecting device) for detecting capacitance formed to correspond to a fingerprint between a detecting electrode and the surface of a finger has known a physical quantity detecting device for detecting a physical quantity supplied from the outside.

FIG. 1 is a diagram illustrating a pixel of a solid-state imaging device. As shown in FIG. 7, a pixel 100 includes a photodiode 101, serving as a photoelectric converter, and four transistors, that is, a transfer transistor 102, a reset transistor 103, an amplifying transistor 104, and a selecting transistor 105, which are connected to one vertical signal line 110. In this structure, N-channel MOS transistors are used as the four transistors 102 to 105.

The selecting transistor 105 is described below. The selecting transistor 105 serves as a switching element performing the selection/non-selection of the pixel 100. It is ideal that, when the selecting transistor 105 is turned on, resistance is zero regardless of a source-drain voltage, and when the selecting transistor 105 is turned off, the resistance has an infinite value regardless of the source-drain voltage.

However, actually, the source-drain voltage capable of turning on the selecting transistor 105 is limited, and the on-resistance is a finite value. In addition, since the selecting transistor 105 is connected in series to the amplifying transistor 104, the pixel 100 having the above-mentioned structure has the following two problems.

(1) Since a voltage drops due to a decrease in the threshold value of the selecting transistor 105, it is difficult to reduce a power supply voltage Vdd.

(2) Noise (for example, 1/f noise and burst noise) caused by the selecting transistor 105 occurs in the vertical signal line 110.

In particular, the 1/f noise and the burst noise cause a problem in a very small pixel. As shown in FIG. 2, the burst noise increases in a very small number of pixels among the pixels arranged in a line, or is randomly moved between a binary value and a ternary value in each pixel. The burst noise and the 1/f noise are more likely to result from the interaction between a channel and a gate oxide film of a transistor.

The 1/f noise is random noise occurring in a large number of pixels among all the pixels. The burst noise causes a very small number of pixels to appear to flicker. As described above, practically, the selecting transistor 105 is not an ideal switch, but has a finite on-resistance. Therefore, noise caused by the selecting transistor 105 as well as the noise of the amplifying transistor 104 occurs in the output.

In the related art, in order to solve the above-mentioned problem (1), the following structure has been proposed: a boosting circuit for raising the power supply voltage Vdd is provided in the same chip as that in which the pixels 100 are formed, and the voltage raised by the boosting circuit, that is, a voltage higher than the power supply voltage Vdd is applied to the selecting transistor 105 as a gate voltage (for example, see Japanese Patent No. 3369911).

SUMMARY OF THE INVENTION

However, the above-mentioned related art is a solution of the problem (1), but does not solve the problem (2) of the noise occurring due to the selecting transistor 105. The reason is as follows. When the gate voltage of the selecting transistor 105 is raised, a large amount of current flows through an interface of an oxide film, not a bulk side, which causes a large amount of noise to occur under the condition of a constant pixel current. That is, the related art increase the noise caused by the selecting transistor 105.

The mounting of the boosting circuit on the same chip as that in which the pixels 100 are formed causes an increase in the manufacturing costs, defects in manufacture, and an increase in the size of a module due to additional external capacity.

Since the selecting transistor 105 of the four transistors 102 to 105 in the pixel 100 serves as only a switch in the related art, the related art does not consider measures for the burst noise or the 1/f noise caused by the finite on-resistance of the selecting transistor 105 and special care in the design.

Here, the problems when the solid-state imaging device is used as the physical quantity detecting device have been described above. However, the problems may arise in other physical quantity detecting devices including the selecting transistors for selecting the pixels.

It is desirable to provide a physical quantity detecting device and an imaging apparatus capable of reducing burst noise or 1/f noise caused by the finite on-resistance of a selecting transistor in a pixel.

According to an embodiment of the invention, a physical quantity detecting device includes: a detecting unit that detects a physical quantity supplied from the outside; and pixels which are two-dimensionally arranged and each of which has a selecting transistor for outputting a signal from the detecting unit to a signal line. In the physical quantity detecting device, the selecting transistor is a depletion-type transistor.

In the physical quantity detecting device according to the above-mentioned embodiment, since the selecting transistor is the depletion-type transistor, the on-resistance of the selecting transistor is reduced although the gate voltage of the selecting transistor is not set to a power supply voltage. In the selecting transistor, a large amount of current flows through a bulk side, not an interface of an oxide film.

DESCRIPTION OF THE PREFERRED EMBODIMENTS

Hereinafter, preferred embodiments of the invention will be described with reference to the accompanying drawings.

In the invention, a solid-state imaging device for detecting the intensity of light incident via a subject is given as an example of a physical quantity detecting device for detecting a physical quantity given from the outside.

Figure 1:
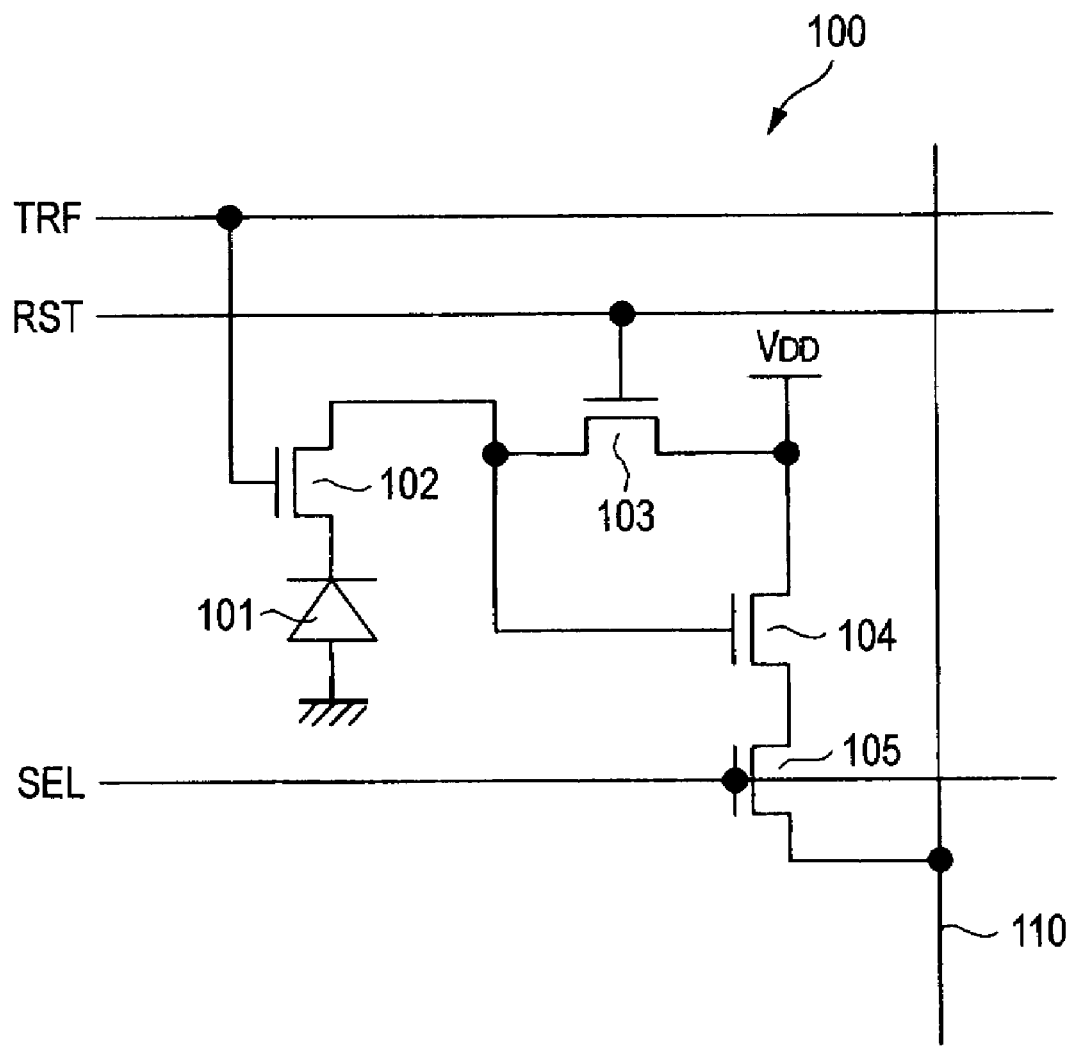
FIG. 1 is a circuit diagram illustrating the circuit structure of a pixel having four transistors.
Figure 2:
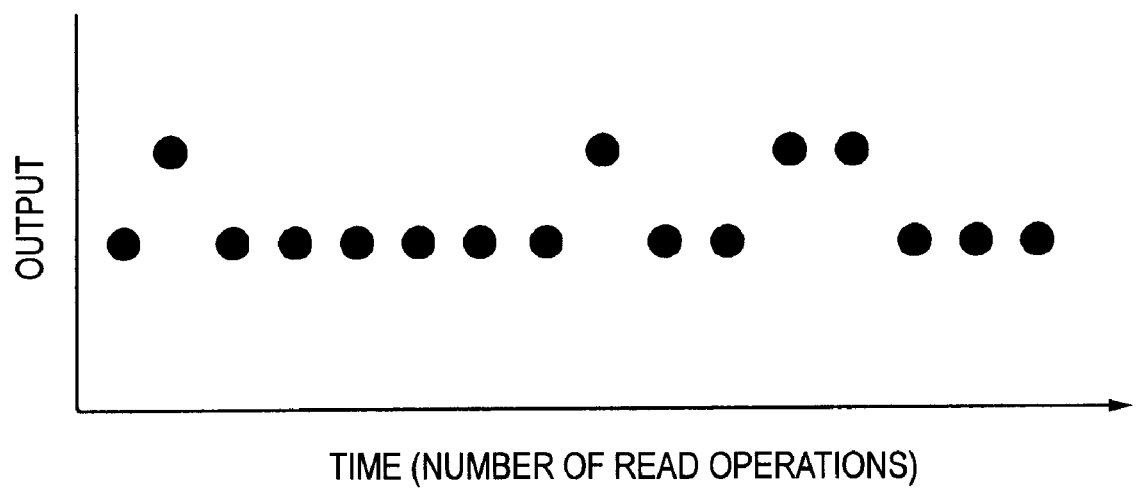
FIG. 2 is a diagram illustrating burst noise.
Figure 3:
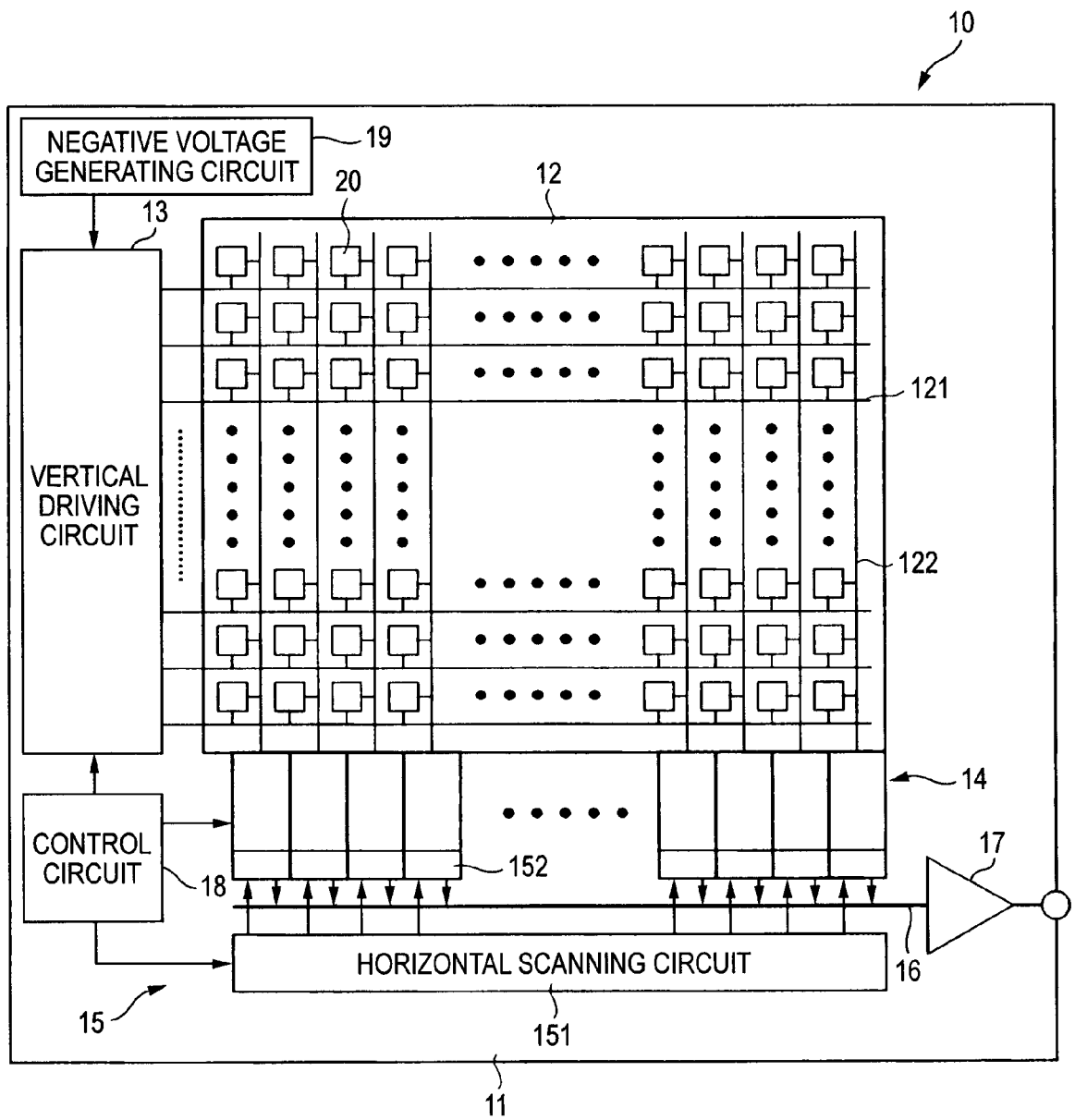
FIG. 3 is a diagram illustrating the structure of a solid-state imaging device according to an embodiment of the invention.

FIG. 3 is a diagram schematically illustrating the structure of a solid-state imaging device according to an embodiment of the invention. In this embodiment, a CMOS (complementary metal oxide semiconductor) image sensor is given as an example of the solid-state imaging device.

As shown in FIG. 3, a solid-state imaging device 10 according to this embodiment includes, on a semiconductor substrate (chip) 11, a pixel array 12, a vertical driving circuit 13, a column circuit group 14, a horizontal driving circuit 15, vertical signal lines 16, an output circuit 17, a control unit 18, and a negative voltage generating circuit 19.

In the pixel array 12, a plurality of pixels 20 each having a photoelectric converter for converting incident light into an electric signal having a charge corresponding to the intensity of the incident light are two-dimensionally arranged. The detailed circuit structure of the pixel 20 will be described later. In the pixel array 12, a pixel driving wiring line 121 is formed for each row of pixels among the pixels arranged, and a vertical signal line 122 is formed for each column of pixels.

The vertical driving circuit 13 sequentially and selectively scans rows of pixels 20 in the pixel array 12, and supplies a necessary driving pulse (control pulse) to the selected row of pixels through the pixel driving wiring line 121. In this embodiment, although not shown in the drawings, the vertical driving circuit 13 includes a read scanning system for performing a read operation of sequentially selecting rows of pixels 20 and reading signals of the selected row of pixels 20 and a shutter scanning system for performing a shutter operation of removing (resetting) the charge stored in the photoelectric converters of the same row of pixels 20 for a time corresponding to a shutter speed before the read scanning by the read scanning system.

Therefore, a period from the timing when unnecessary charges of the photoelectric converters are reset by the shutter operation of the shutter scanning by the shutter scanning system to the timing when the signals of the pixels 20 are read by the read scanning by the read scanning system is the signal charge storage time (exposure time) of the pixel 20. That is, an electron shutter operation means an operation of resetting the signal charge stored in the photoelectric converter and starting to store a new signal charge.

The signals output from the selected row of pixels 20 are supplied to the column circuit group 14 through the vertical signal wiring lines 122. The column circuit group 14 includes column circuits provided so as to have a one-to-one correspondence with columns of pixels in the pixel array 12. The column circuit group 14 receives the signals output from each row of pixels 20 through the vertical signal lines and performs amplification or correlated double sampling (CDS) on the received signals to remove a fixed pattern noise peculiar to the pixels. Each of the column circuits of the column circuit group 14 may have an A/D (analog-to-digital) converting function.

The horizontal driving circuit 15 includes a horizontal scanning circuit 151 and a horizontal selecting switch group 152. The horizontal scanning circuit 151 is composed of a shift register. The horizontal scanning circuit 151 sequentially scans switches of the horizontal selecting switch group 152 and sequentially outputs to the horizontal signal lines 16 the signals corresponding to one row of pixels that have been processed by the column circuits of the column circuit group 14.

The output circuit 17 performs various signal processes on the signals sequentially supplied from the column circuits of the column circuit group 14 through the horizontal selecting switch group 152 and the horizontal signal lines 16 and outputs the processed signals as output signals OUT. The output circuit 17 may perform only a buffering process, or it may perform, for example, a process of adjusting a black level, a process of correcting the deviation between columns of pixels, a process of amplifying signals, and a process related to colors before the buffering process.

The control circuit 18 receives data controlling the operational mode of the solid-state imaging device 10 through an interface (not shown), or it outputs data including information of the solid-state imaging device 10 to the outside, generates a clock signal or a control signal for controlling the operation of the vertical driving circuit 13, the column circuit group 14, and the horizontal driving circuit 15 on the basis of a vertical synchronization signal Vsync, a horizontal synchronization signal Hsync, and a master clock signal MCK, and supplies the signal to each circuit.

The negative voltage generating circuit 19 is formed of, for example, a charge pump circuit. The negative voltage generating circuit 19 generates a negative voltage on the basis of a power supply voltage Vdd and supplies the generated negative voltage to the vertical driving circuit 13. In order to reduce a dark current, the CMOS image sensor is provided with a negative voltage generating circuit for changing a gate voltage when a transfer transistor of the pixel 20 is turned off to a voltage closer to an off side than to the voltage of a well in which the transfer transistor is formed, for example, a negative voltage in this embodiment (see JP-A-2002-217397). The negative voltage generating circuit may be used as the negative voltage generating circuit 19.

Pixel Circuit

Figure 4:
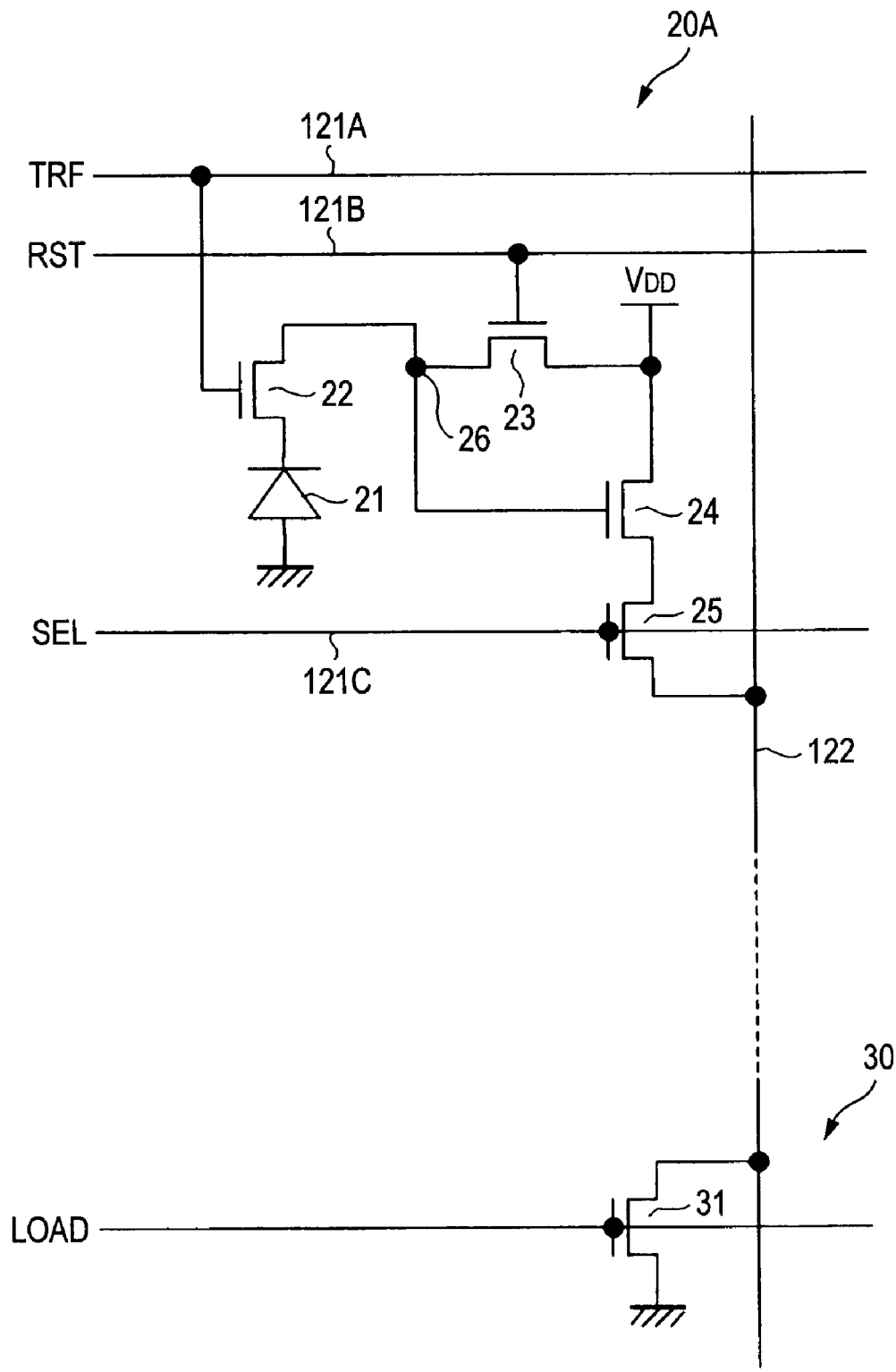
FIG. 4 is a circuit diagram illustrating the circuit structure of a pixel according to a first circuit example.

FIG. 4 is a circuit diagram illustrating the circuit structure of a pixel 20A according to a first circuit example. As shown in FIG. 4, the pixel 20A according to the first circuit example includes a photodiode 21, serving as a photoelectric converter, and four transistors, such as a transfer transistor 22, a reset transistor 23, an amplifying transistor 24, and a selecting transistor 25. In this embodiment, N-channel MOS transistors are used as the four transistors 22 to 25.

The pixel driving wiring line 121 including a transmission wiring line 121A, a reset wiring line 121B, and a selection wiring line 121C is formed for each row of pixels 20A.

In FIG. 4, the photodiode 21 converts incident light into a charge (in this embodiment, an electron) corresponding to the intensity of the incident light. A cathode of the photodiode 21 is electrically connected to a gate of the amplifying transistor 24 through the transfer transistor 22. A node electrically connected to the gate of the amplifying transistor 24 is called an FD (floating diffusion) portion 26. The FD portion 26 holds a signal charge transmitted from the photodiode 21 and converts the signal charge into a voltage.

The transfer transistor 22 is connected between the cathode of the photodiode 21 and the FD portion 26, and is turned on when a transmission pulse TRF is supplied to the gate thereof through the transmission wiring line 121A, which causes the optical charge that has been subjected to photoelectric conversion by the photodiode 21 and then stored in the photodiode 21 to be transmitted to the FD portion 26.

The reset transistor 23 has a drain connected to a power line of the power supply voltage Vdd, a source connected to the FD portion 26, and a gate connected to the reset wiring line 121B. When the reset pulse RST is supplied to the gate of the reset transistor 23, the reset transistor 23 is turned on, which causes the charge of the FD portion 26 to be transmitted to the power (Vdd) line before the signal charge is transmitted from the photodiode 21 to the FD portion 26, thereby resetting the FD portion 26.

The amplifying transistor 24 has a gate connected to the FD portion 26 and a drain connected to the power line of the power supply voltage Vdd. The amplifying transistor 24 outputs the potential of the FD portion 26 reset by the reset transistor as a reset level and also outputs, as a signal level, the potential of the FD portion 26 after the signal charge is transmitted from the photodiode 21 by the transfer transistor 22.

For example, the selecting transistor 25 has a drain connected to the source of the amplifying transistor 24 and a source connected to the verticals signal line 122. That is, the selecting transistor 25 is connected in series to the amplifying transistor 24 between the amplifying transistor 24 and the vertical signal line 122. The selecting transistor 25 is turned on when a selection pulse SEL is supplied to the gate thereof through the selection wiring line 121C, which causes the pixel 20A to be in a selected state. As a result, the signal amplified by the amplifying transistor 24 is output to the vertical signal line 122.

Figure 5:
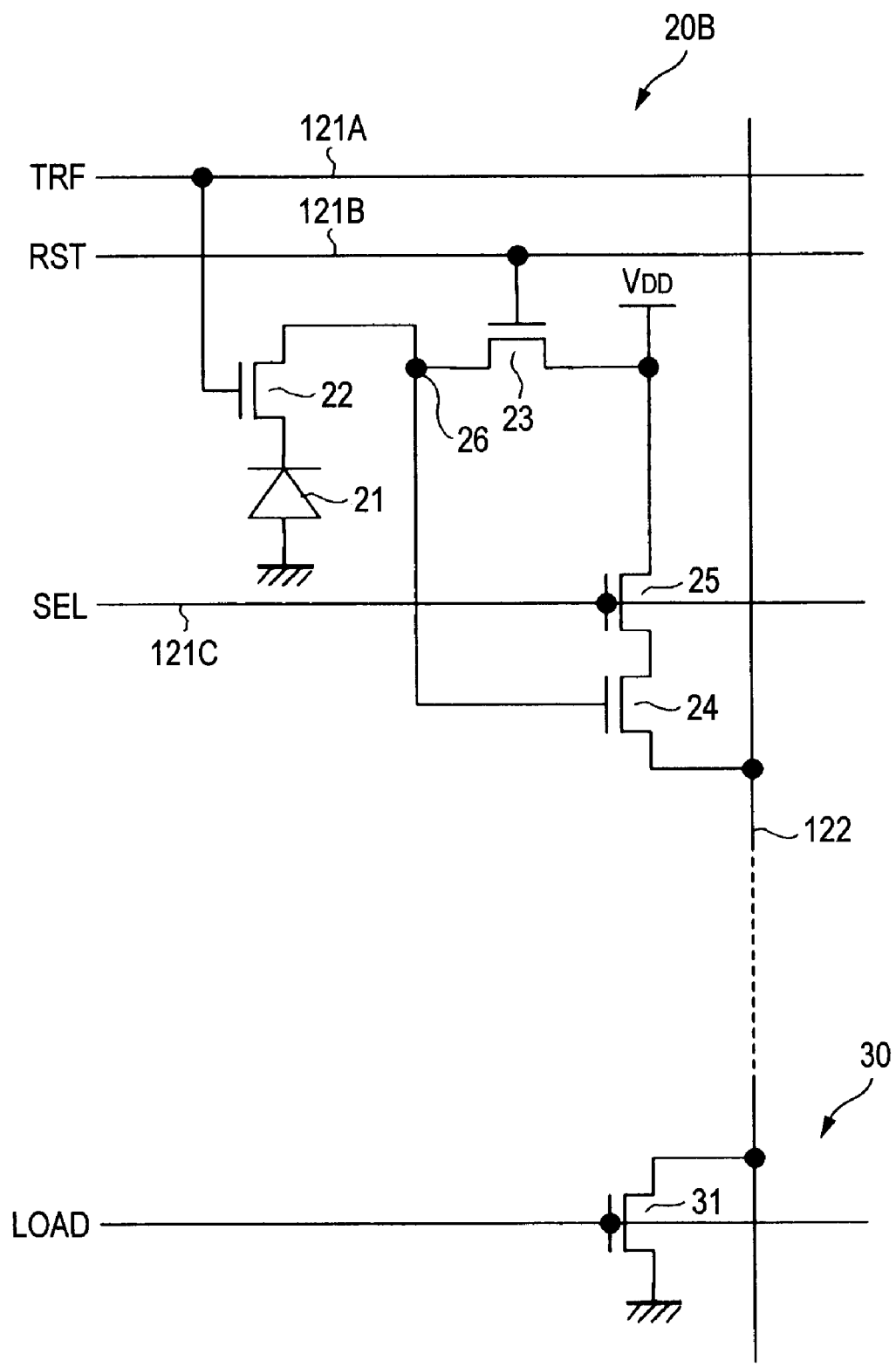
FIG. 5 is a circuit diagram illustrating the circuit structure of a pixel according to a second circuit example.

FIG. 5 is a circuit diagram illustrating the circuit structure of a pixel 20B according to a second circuit example. In the second circuit example, the same components as those shown in FIG. 4 have the same reference numerals.

As shown in FIG. 5, similar to the pixel 20A according to the first circuit example, the pixel 20B according to the second circuit example includes a photodiode 21, serving as a photoelectric converter, and four transistors, such as a transfer transistor 22, a reset transistor 23, an amplifying transistor 24, and a selecting transistor 25.

The pixel 20B according to the second circuit example differs from the pixel 20A according to the first circuit example in that the selecting transistor 25 is connected in series to the amplifying transistor 24 between the power (Vdd) line and the amplifying transistor 24. That is, the selecting transistor 25 has a drain connected to the power (Vdd) line, a source connected to the drain of the amplifying transistor 24, and a gate connected to a selection wiring line 121C. When the selection pulse SEL is supplied to the gate of the selecting transistor 25 through the selection wiring line 121C, the selecting transistor 25 is turned on, which causes the power supply voltage Vdd is supplied to the drain of the amplifying transistor 24, so that the pixel 20B is selected.

Vertical Driving Circuit

Figure 6:
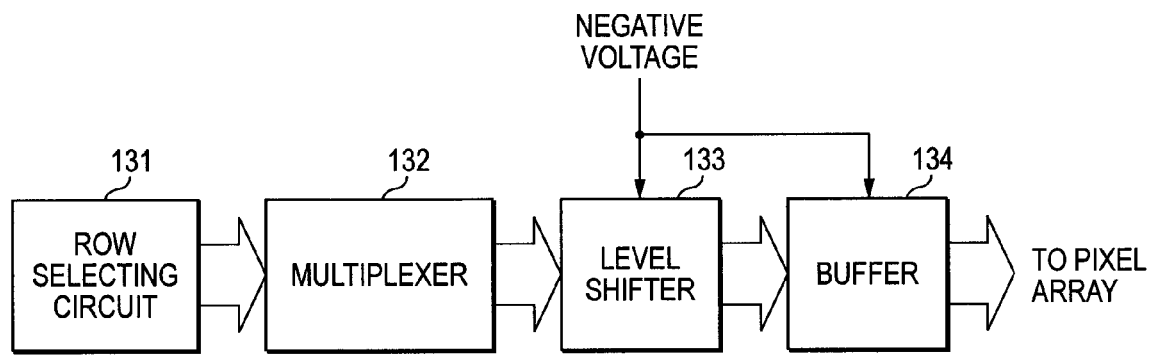
FIG. 6 is a block diagram illustrating an example of the structure of a vertical driving circuit.

FIG. 6 is a block diagram illustrating an example of the structure of the vertical driving circuit 13. As shown in FIG. 6, the vertical driving circuit 13 includes a row selecting circuit 131, a multiplexer 132, a level shifter 133, and a buffer 134. In FIG. 6, For example, the ground or a power input system is not shown.

The row selecting circuit 131 is formed of a shift register or a decoder, and selectively scans row of pixels in the pixel array 12 on the basis of a scanning signal or an address signal supplied from the control circuit 18. The multiplexer 132 outputs pixel driving pulses supplied from the control circuit 18 to the row of pixels selectively scanned by the row selecting circuit 131 as a transmission pulse TRF, a reset pulse RST, and a selection pulse SEL.

The level shifter 133 shifts the high level and the low level of the pixel driving pulse supplied from the multiplexer 132 to a predetermined level (level conversion). The level shifter 133 is supplied with a negative voltage generated by the negative voltage generating circuit 19. The pixel driving pulses whose levels are shifted by the level shifter 133, that is, the transmission pulse TRF, the reset pulse RST, and the selection pulse SEL are supplied to the pixel driving wiring line 121 (that is, the transmission wiring line 121A, the reset wiring line 121B, and the selection wiring line 121C) through the buffer 134 having low impedance.

The solid-state imaging device 10 having the above-mentioned structure is characterized in that a depletion-type transistor is used as the selecting transistor 25 in the pixel 20. The use of the selecting transistor 25 of a depletion type makes it possible to prevent a reduction in a threshold value without raising the gate voltage of the selecting transistor 25, unlike the related art, and thus the selecting transistor can operate at a low voltage. In addition, it is possible to reduce the on-resistance of the selecting transistor 25.

According to the embodiment of the invention, 1/f noise or burst noise is reduced, unlike the related art that raises the gate voltage. This is because the depletion causes a large amount of current to flow through a bulk side, not an interface of an oxide film, in the selecting transistor 25.

However, since the depletion-type transistor has a characteristic that it is not turned off, that is, a current is not interrupted with respect to a ground voltage, i.e., a voltage that is equal to that of a well in which the transistor is formed, the depletion-type transistor is not generally used as a switching element. The selecting transistor 25 has the function of a switch, and as shown in FIG. 4, the voltage of the source thereof is equal to the ground voltage through a load transistor 31 of a constant current source 30 connected to the vertical signal line 122. Therefore, the selecting transistor does not belong to the above-mentioned example.

However, the embodiment of the invention uses the depletion-type transistor as the selecting transistor 25. In this case, it is also possible to give the depletion-type transistor a function of selecting rows of pixels on the basis of a difference in potential between the on state and the off state of the selecting transistor 25. In this structure, a large amount of current does not flow through the selecting transistor 25 because a current value of the constant current source is several microamperes per vertical signal line, and thus it is preferable that the selecting transistor 25 interrupt the flow of current. This is because power consumption increases, a current flows through a specific pixel to change the characteristics of the pixel, or a thermal electron white point occurs.

Therefore, in the embodiment of the invention, since the depletion-type transistor is used as the selecting transistor 25 and the selecting transistor 25 interrupts current flow, it is effective to use at least one of the following two methods: first, when all the selecting transistors 25 of the pixels 20 connected to one vertical signal line 122 are turned off, the constant current source 30 is also turned off; and second, when the selecting transistor 25 is turned off, a negative voltage is applied to the gate.

Even when the depletion-type transistor is used as the selecting transistor 25, the use of one of or both the two methods makes it possible to interrupt a current with the selecting transistor 25. Therefore, it is possible to prevent an increase in power consumption, a variation in characteristic, or a thermal electron white point and thus to obtain the effects by the depletion-type transistor, that is, the effects of reducing 1/f noise or burst noise caused by the finite on-resistance of the selecting transistor 25.

Next, the latter method, that is, embodiments of applying a negative voltage to the gate when the selecting transistor 25 is turned off will be described in detail below.

First Embodiment

The first embodiment is characterized in that, when the selecting transistor 25 of the pixel 20 is turned off, the gate voltage thereof is set to a voltage closer to an off side than to the voltage of a well in which the selecting transistor 25 is formed, that is, a negative voltage.

More specifically, the negative voltage generated by the existing negative voltage generating circuit 19 (see FIG. 3) is used, and the level shifter 133 shown in FIG. 6 shifts the level of the selection pulse SEL (level conversion), so that the low level of the selection pulse SEL among the pixel driving pulses is set to the negative voltage of the negative voltage generating circuit 19. Therefore, when the selecting transistor 25 is turned off, the negative voltage is applied to the gate of the selecting transistor 25.

In the constant current source 30, a voltage slightly higher than a threshold voltage is applied to the gate of the load transistor 31, which causes a small constant current of about several microamperes to flow to the selecting transistor 25 through the vertical signal line 122.

The reference voltage of the selecting transistor 25 is the voltage of a P well, which is a back bias. The voltage of the P well is the ground voltage. When the negative voltage is applied to the gate with respect to the reference voltage, which is the ground voltage, the selecting transistor 25, which is the depletion-type transistor, can interrupt a current.

As described above, when the depletion-type transistor is used as the selecting transistor 25 and the selecting transistor 25 of the pixel 20 is turned off, the gate voltage thereof is set to a voltage closer to an off side than to the voltage of a well in which the selecting transistor 25 is formed, that is, a negative voltage, which makes it possible for the selecting transistor 25 to reliably interrupt a current in an off state and thus to obtain the effects by the depletion-type transistor, that is, the effects of reducing 1/f noise or burst noise caused by the finite on-resistance of the selecting transistor 25.

The existing negative voltage generating circuit 19 is used, and the negative voltage that is generated by the negative voltage generating circuit 19 and applied to the gate of the transfer transistor 22 when the transfer transistor 22 is turned off is also used as a low-level gate voltage of the selecting transistor 25. Therefore, this embodiment makes it unnecessary to arrange the negative voltage generating circuit 19. Thus, this embodiment prevents an increase in the manufacturing cost, defects in manufacture, and additional external capacity, which makes it possible to prevent an increase in the size of a module.

When the embodiment in which the negative voltage is applied to the gate of the selecting transistor 25 when the selecting transistor 25 is turned off is used, it is preferable to use a pixel structure in which the pixel 20A, which is the pixel 20, according to the first circuit example, that is, the selecting transistor 25 be connected in series between the amplifying transistor 24 and the vertical signal line 122.

The reason is as follows. In the case of the pixel 20B according to the second circuit example, the negative voltage applied to the gate of the selecting transistor 25 and the power supply voltage Vdd applied to the drain thereof increase the difference between the potentials of the gate and the drain, which causes difficulty in improving the reliability of the selecting transistor 25. Therefore, in the case of the pixel 20A according to the first circuit example, even when the negative voltage is applied to the gate of the selecting transistor 25, it is possible to maintain a small difference between the potentials of the gate and the drain.

In FIG. 6, in the level shifter 133, a unit circuit having a level shift function is provided for each row of pixels, corresponding to each of the transmission pulse TRF, the reset pulse RST, and the selection pulse SEL.

The negative voltage generated by the negative voltage generating circuit 19 is applied to a unit circuit for the transmission pulse TRF as a negative power supply voltage in order to reduce the dark current. In addition, the negative voltage is applied to a unit circuit for the selection pulse SEL as a negative power supply voltage (the ground voltage in the related art) in order to reduce the 1/f noise or the burst noise. Alternatively, the negative voltage may be applied to a unit circuit for the reset pulse RST as a negative power supply voltage. In this way, the common negative voltage can be supplied to the unit circuit for the transmission pulse TRF, the unit circuit for the selection pulse SEL, and the unit circuit for the reset pulse RST, which makes it possible to simplify the structure of the level shifter 133.

Second Embodiment

Figure 7:
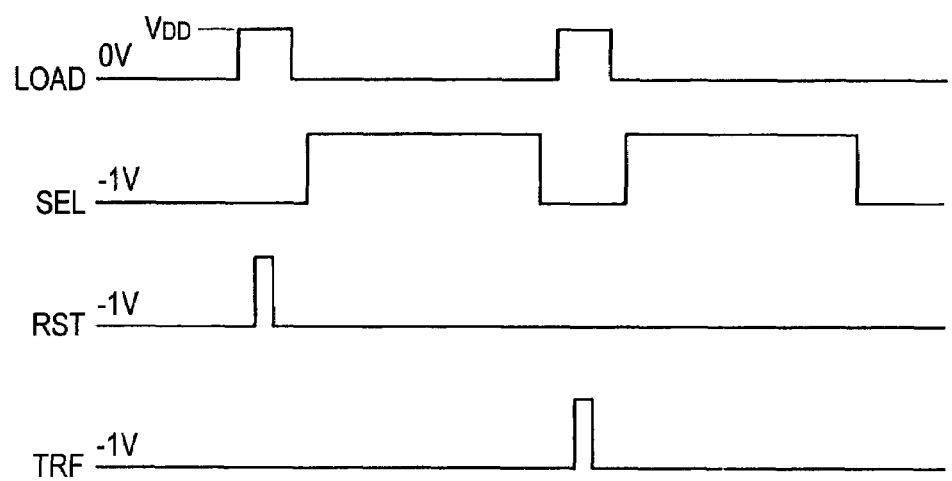
FIG. 7 is a timing chart illustrating an operation when a method according to a second embodiment is applied.

In the first embodiment, the load transistor 31 is used as the constant current source 30 for supplying a current of several microamperes. However, in the second embodiment, the load transistor 31 operates as a switching element, not as a constant current source. More specifically, in FIG. 4, a switching pulse LOAD shown in FIG. 7 is supplied to the gate of the load transistor 31, which causes the load transistor 31 to serve as a switching element.

In this embodiment, the load transistor 31 simply operates as a switch. Therefore, when the load transistor 31 is turned on, a large amount of current of several tens of microamperes flows. More specifically, for example, the high level of the gate voltage when the load transistor 31 is turned on, that is, the high level of the switching pulse LOAD is set to the power supply voltage Vdd. In this embodiment, similar to the first embodiment, the selecting transistor 25 is a depletion-type transistor. In addition, when the selecting transistor 25 is turned off, a negative voltage is applied to the gate of the selecting transistor 25.

Next, the operation of the pixel 20 and the load transistor 31 when a method according to the second embodiment is applied will be described with reference to a timing chart shown in FIG. 7.

The switching pulse LOAD for switching the load transistor 31 is activated (for example, the power supply voltage Vdd) with the selecting transistors 25 of all the pixels that are connected to the vertical signal line being turned off (with the selecting transistors being at a low level). Then, the load transistor 31 is turned on, which causes the potential of the vertical signal line 122 to turn to a predetermined voltage, for example, the ground voltage in this embodiment. The reset pulse RST is activated (high level) during the potential of the vertical signal line 122 at a low level, and then the reset transistor 23 is turned on, which causes the FD portions 26 of the selected row of pixels 20 to be reset.

Then, the selection pulse SEL of the selected row of pixels is activated (high level) to turn on the selecting transistor 25. This causes the potential of the vertical signal line 122 to approach to a voltage corresponding to the potential of the FD portion 26, which reflects that the FD portion 26 is reset by the reset transistor 23.

The corresponding column circuit of the column circuit group 14 (see FIG. 3) samples the potential of the vertical signal line 122 as a reset level in a stage in which the potential of the vertical signal line 122 approaches to a voltage corresponding to the potential of the FD portion 26. Then, the selection pulse SEL is inactivated (for example, a negative voltage of −1 V) to turn off the selecting transistor 25.

Next, the load transistor 31 is turned on by the switching pulse LOAD to change the potential of the vertical signal line 122 to a low level, and the transmission pulse TRF is activated (high level) during the potential of the vertical signal line 122 at the low level to turn on the transmission transistor 22, which causes the signal charge obtained by the photoelectric conversion of the photodiode 21 to be transmitted to the FD portion 26.

Then, the selection pulse SEL of the selected row of pixels is activated to turn on the selecting transistor 25. This causes the potential of the vertical signal line 122 to approach to a voltage corresponding to the potential of the FD portion 26. This indicates that the signal charge is transmitted from the photodiode 21 and is then stored in the FD portion 26.

The column circuit samples the potential of the vertical signal line 122 as a signal level in a stage in which the potential of the vertical signal line 122 approaches to a voltage corresponding to the potential of the FD portion 26 to some extent. Then, the selection pulse SEL is inactivated to turn off the selecting transistor 25.

The corresponding column circuit of the column circuit group 14 uses the difference between a reset level obtained by first sampling and a signal level obtained by second sampling to remove fixed pattern noise peculiar to the pixel, thereby obtaining a signal not including the fixed pattern noise.

As described above, the load transistor 31 operates as a switch, not as a constant current source, and the potential of the vertical signal line 122 turns to a low level by a short pulse. Then, a signal is read from the pixel 20 without a constant current flowing therethrough. As a result, it is possible to prevent voltage loss in the load transistor 31 and thus to reduce power consumption. In addition, since only a charge/discharge current flows through the vertical signal line 122, it is possible to reduce power consumption.

Further, since the potential of the vertical signal line 122 is changed to a low level by a short pulse, the load transistor 31 is used as a switch having low impedance, not as a constant current source. In this case, when a depletion-type transistor is used as the selecting transistor 25, the selecting transistor 25 cannot be turned off in the active period of the switching pulse LOAD applied to the load transistor 31, which causes a current that is ten to hundred times larger than that in the first embodiment to flow. In this case, the same serious problem as that in the first embodiment in which the depletion-type transistor is merely used as the selecting transistor 25 arises, and the problem of a voltage drop in a ground line or a power line also arises. For the reason, it is effective that the gate voltage when the selecting transistor 25 is turned off is set to a negative and the selecting transistor 25 is switched to interrupt a current.

In the above-described embodiments, the N-channel MOS transistors are used as the four transistors 22 to 25 of each of the pixels 20A and 20B according to the first and second circuit examples, but the invention is not limited thereto. For example, P-channel MOS transistors may be used as the four transistors 22 to 25. In this case, a boosting circuit may be provided instead of the negative voltage generating circuit 19, and when the selection transistor 25 is turned off, a voltage higher than the power supply voltage Vdd may be set as the gate voltage.

In the above-described embodiments, the solid-state imaging device for detecting the intensity of light incident through a subject is used as a physical quantity detecting device for detecting a physical quantity supplied from the outside, but the invention is not limited thereto. For example, the physical quantity detecting device may be a fingerprint detecting device (capacitance detecting device) for detecting capacitance formed to correspond to the fingerprint between a detecting electrode and the surface of a finger or a detecting device for detecting pressure or the distribution of a chemical material as a physical quantity supplied from the outside. In addition, the invention may be applied to all physical quantity detecting devices including a detecting unit for detecting a physical quantity supplied from the outside and pixels two-dimensionally arranged, each having a selecting transistor for selectively outputting a signal from the detecting unit to a signal line.

Applications

The solid-state imaging device 10 according to the above-described embodiments is preferably used as an imaging device (image input device) of an imaging apparatus, such as a digital still camera or a video camera.

The imaging apparatus means a camera module (for example, a camera module mounted on an electronic apparatus, such as a cellular phone) including a solid-state imaging device, serving as an imaging device, an optical system for forming an optical image of a subject on an imaging surface (light receiving surface) of the solid-state imaging device, and a circuit for processing signals of the solid-state imaging device and a camera system including the camera module, such as a digital still camera or a video camera.

Figure 8:
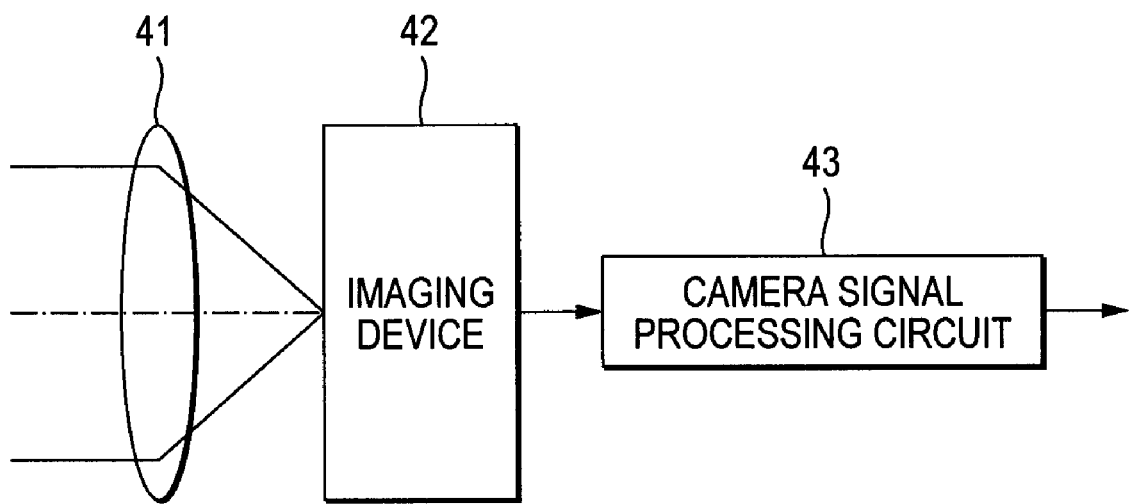
FIG. 8 is a block diagram illustrating an example of the structure of an imaging device according to an embodiment of the invention.

FIG. 8 is a block diagram illustrating an example of the structure of an imaging apparatus according to an embodiment of the invention. As shown in FIG. 8, the imaging apparatus according to the embodiment of the invention includes an optical system having a lens 41, an imaging device 42, and a camera signal processing circuit 43.

The lens 41 focuses an optical image from a subject on the imaging surface of the imaging device 42. The imaging device 42 outputs image signals obtained by converting the optical image formed on the imaging surface by the lens 41 into electric signals in the units of pixels. The solid-state imaging device 10 according to the above-described embodiments is used as the imaging device 42. The camera signal processing unit 43 performs various signal processes on the image signals output from the imaging device 42.

As described above, in the imaging apparatuses, such as a video camera, an electronic still camera, and a camera module provided in a mobile apparatus, such as a cellular phone, the solid-state imaging device 10 according to the above-described embodiments is used as the imaging device 42, which makes it possible to reduce 1/f noise or burst noise caused by the finite on-resistance of the selecting transistors of the pixels in the solid-state imaging device 10, and thus to obtain an imaging apparatus having very small noise.

It should be understood by those skilled in the art that various modifications, combinations, sub-combinations and alterations may occur depending on design requirements and other factors insofar as they are within the scope of the appended claims or the equivalents thereof.

What is claimed is:

1. A physical quality detecting device comprising:
a detecting unit that detects a physical quantity supplied from the outside; and
pixels which are two-dimensionally arranged and each of which has a selecting transistor for outputting a signal from the detecting unit to a signal line,
wherein,
the selecting transistor is a depletion-type transistor,
a constant current source is connected to the signal line,
when the selecting transistors of all the pixels corresponding to the signal line are turned off, the constant current source is turned off, and
when a selecting transistor is turned off, a gate voltage of the selecting transistor is set to a voltage closer to an off side than to the voltage of a well in which the selecting transistor is formed to thereby reliably interrupt a current in the off state and thus reduce noise otherwise caused by finite on state resistance of the selecting transistor.

2. The physical quality detecting device according to claim 1, wherein:
the pixel includes an amplifying transistor for amplifying the signal from the detecting unit, and
the selecting transistor is connected in series to the amplifying transistor between the amplifying transistor and the signal line.

3. The physical quality detecting device according to claim 1, wherein:
a switching element for electively switching the potential of the signal line to a predetermined voltage is connected to the signal line, and
after the potential of the signal line is switched to a predetermined voltage by the switching element, the selecting transistor is turned on to output a signal of the pixel to the signal line.

4. The physical quality detecting device according to claim 1, wherein:
the pixel includes a charge storage unit and a transfer transistor for transmitting a signal charge corresponding to the physical quantity detected by the detecting unit to the charge storage unit, and
when a gate voltage of the transfer transistor in an off state is set to a voltage closer to an off side than to the voltage of a well in which the transfer transistor is formed, the gate voltage when the selecting transistor is turned off is also used as the gate voltage when the transfer transistor is turned off.

5. An imaging apparatus comprising:
a solid-state imaging device including pixels two-dimensionally arranged, each having a photoelectric conversion element for converting incident light into an electric signal and a selecting transistor for selectively outputting a signal line a voltage corresponding to a signal charge of the photoelectric conversion element; and
an optical system that guides light from a subject onto an imaging surface of the solid-state imaging device,
wherein,
the solid-state imaging device includes depletion-type transistors as the selecting transistors,
a constant current source is connected to the signal line,
when the selecting transistors of all the pixels corresponding to the signal line are turned off, the constant current source is turned off, and
when a selecting transistor is turned off, a gate voltage of a selecting transistor is set to a voltage closer to an off side than to the voltage of a well in which the selecting transistor is formed to thereby reliably interrupt a current in the off state and thus reduce noise otherwise caused by finite on state resistance of the selecting transistor.

* * * * *